Dec. 31, 1957 E. D. ELIASON 2,817,946
HARVESTING PICKUP WITH RECIPROCATING REEL
Filed March 29, 1955 2 Sheets-Sheet 1

INVENTOR.
EDGAR DONALD ELIASON
BY
Edward Eversley Bishop
his attorney

Dec. 31, 1957  E. D. ELIASON  2,817,946
HARVESTING PICKUP WITH RECIPROCATING REEL
Filed March 29, 1955  2 Sheets-Sheet 2

INVENTOR.
EDGAR DONALD ELIASON
BY Edward Eversley Bishop
his attorney

2,817,946

HARVESTING PICKUP WITH RECIPROCATING REEL

Edgar D. Eliason, Wetaskiwin, Alberta, Canada

Application March 29, 1955, Serial No. 497,679

15 Claims. (Cl. 56—364)

The present invention generally relates to harvesting machines and more particularly and specifically to a new and improved pick-up device for use with a harvesting machine to gather crops that have been swathed and left in the field.

In the gathering of swathed crop it has heretofore been the practice to employ a vehicular machine provided on its forward end with a pick-up reel including a plurality of tines which tines rotate with the reel in a forwardly direction, upwardly and then rearwardly, to deposit the gathered crop on a conveying table rearwardly from the pick-up reel. In all such prior art pick-up devices the tines operate exclusively in a path aligned with the direction of travel of the vehicular machine along a row of swathed crop.

It has been discovered however that in the gathering of swathed crop with prior art devices 15% to 30% of the swathed harvest is left in the field after the pick-up device has passed since such devices will not effectively pick up and gather harvest which lies in the field in alignment with the direction of machine travel. In order for a swathed harvest to be gathered by these prior devices it is necessary that the harvest lie on the field in angular disposition relative to the direction of machine travel and direction of rotation of the pick-up tines.

Therefore, it has been the practice, in an effort to eliminate this inherent disadvantage in prior art devices, for the operator of the harvesting machine to continuously alternate the direction of travel of the vehicular machine back and forth angularly across the general forward path of direction of machine travel in order that the direction of movement of the pick-up tines will be presented angularly to the swathed harvest. This practice has somewhat reduced the inefficiency of prior pick-up assemblies, although it has not completely eliminated them since there will always be harvest lying in the direction of machine travel.

Additionally, the practice of operators to continuously alternate the direction of machine travel is extremely arduous and tiring on the operator as well as time consuming whereupon the time required to harvest a given acreage is greatly increased.

It is therefore a general object of the present invention to provide a pick-up assembly for a harvest machine which will eliminate this primary and inherent disadvantage of prior constructions.

It is a principal object of the present invention to provide a gathering or pick-up assembly for a harvesting machine which will by its novel construction and operation present the pick-up tines of the assembly angularly to the swathed harvest at all times without alternating the forward direction of travel of the machine.

Another object is to provide a pick-up assembly which will continuously present the pick-up tines angularly to the swathed harvest which includes a pick-up reel having tines which will continuously oscillate or reciprocate the entire pick-up assembly laterally of the machine and of the normal direction of machine travel.

A further object of the present invention is to provide construction which will support a pick-up assembly for lateral oscillation or reciprocation on the forward end of a harvesting machine and which will provide for the continuous reciprocation of said assembly during the forward movement of said machine.

Still a further object of the instant invention resides in the provision of construction including a laterally reciprocal pick-up assembly which provides for control of the lateral reciprocation of the assembly to permit the amount of reciprocation to be quickly and easily adjusted within limits defined by maximum reciprocation to a point of no reciprocation.

It is still another object of this invention to provide a pick-up assembly having the advantages above set forth which is capable of manufacture as a construction to be quickly and readily adapted for attachment to present harvesting machines as well as an assembly which can be manufactured together with a harvesting machine as a new unitary article of manufacture.

Still further it is an object to provide a new and improved pick-up assembly of the type above set forth which is of extremely simple and inexpensive design and manufacture, and which is durable and long-lasting in use.

Still other objects and advantages of the present invention will become readily apparent to those skilled in the art when the following general statement and description are read in the light of the accompanying drawings.

The nature of the present invention may be stated in general terms as comprising a pick-up assembly for a harvesting machine including a pick-up reel having a plurality of tines rotatably mounted on said reel, drive means for rotating said tines relative to said reel, means mounting said reel for lateral reciprocal movement relative to said harvesting machine and means having operative connection with a power source for reciprocating said reel laterally relative to said harvesting machine.

Referring to the drawings in which like designations indicate similar parts throughout the several views.

Figure 1:
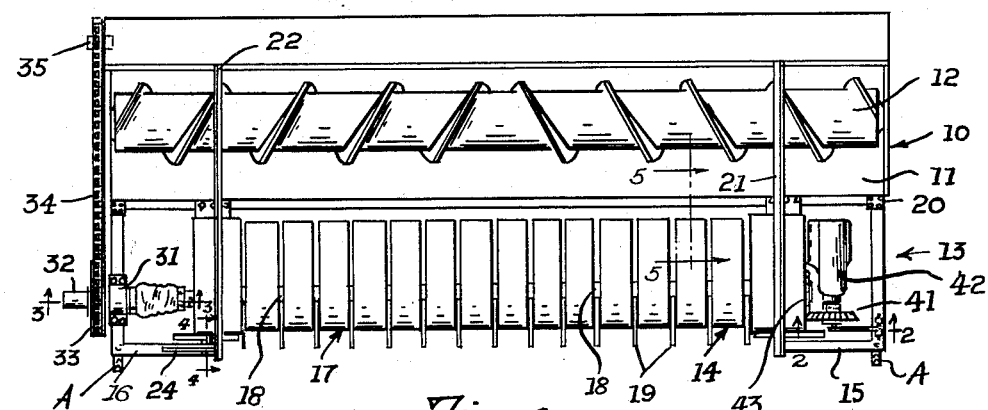
Fig. 1 is a top plan view of the pick-up assembly as secured to a fragmentarily illustrated harvesting machine.

The present invention, as disclosed by way of illustration only in the accompanying drawings, includes a pick-up assembly carried by a harvesting machine for the purpose of gathering swathed harvest from the field. In the preferred embodiment illustrated 10 generally designates a harvesting machine which includes a forwardly extending gathering platform 11 which is provided adjacent the rearward end thereof with a gathering conveyor 12 which conventionally moves the gathered harvest to a central region of the platform and rearwardly onto a conveyor system which moves the harvest rearwardly of the machine to a place of storage.

The new and improved pick-up assembly constituting the present invention is generally designated at 13 and includes a pick-up reel construction 14 supported laterally of the forward end of the harvesting machine platform 11 by means of side frame members 15 and 16 which are secured to the harvesting machine at one point thereon and which are supported above the ground level by caster type wheels A under the forward portions thereof.

The pick-up reel 14 is of conventional construction and includes a plurality of flat stripper plates 17 rigidly secured in spaced relationship to enclose a driven shaft 18 which carries thereon a plurality of pick-up tines 19 which are so located and secured to the driven shaft 18 so that they project outwardly between adjacent stripper plates to rotate in the opening between said plates upwardly and rearwardly of said assembly. In this manner the pick-up tines 19 will engage and gather swathed harvest upon forward movement of the machine and lift the harvest and convey it rearwardly over the stripper plates to deposit it on the gathering platform 11 of the harvesting machine. Since, in the present invention, the construction of the pick-up reel per se is consistent with prior devices, the details of the construction of the reel will not be herein described.

The frame members 15 and 16 consist of channel members of general L-shaped configuration which are secured as at 20, to the front corners of the gathering platform 11 of the machine to extend forwardly thereof and then inwardly in end to end opposition where they terminate intermediate the width of the two end stripper plates of the pick-up reel. The inner ends of the frames 15 and 16 are braced by support bars 21 which extend upwardly and rearwardly over the pick-up reel to be secured to a remote point on the harvesting machine as at 22. The support bars 21 also extend downwardly and rearwardly beneath the reel assembly, Fig. 5, where they are secured to the underside of the gathering platform 11 as at 23.

At those points where the support bars 21 are secured to the extended ends of the frames 15 and 16 buttress plates 24 are provided on the upper faces of the frames 15 and 16 and these plates mount roller members 25 which are located between the plates and the forward edges of the endmost stripper plates of the reel assembly. The endmost stripper plates of the reel assembly in turn support elongated track bar members 26 which are of inverted U-shaped cross section and which engage over and are supported on the roller members 25. Retaining pins 27 are supported from the buttress members 24 to overlie the upper surfaces of the track plates 26 to retain the tracks on the rollers and prevent vertical disengagement of the two.

By the foregoing construction the harvesting reel is mounted on its forward edges on the extended ends of the frames 15 and 16 for lateral reciprocation relative to said frames by reason of the rollable support between the track bars 26 and the rollers 25.

Figure 5:
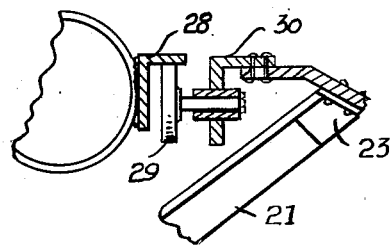
Fig. 5 is an enlarged vertical section taken on line 5—5, Fig. 1.

As is shown in Fig. 5, a channel bar 28 is secured lengthwise of the reel assembly across the rearmost edges thereof, and said channel bar is seated downwardly on a plurality of laterally spaced rollers 29 which are rotatably supported from the front edge of the gathering platform 11 by means of support brackets 30. In this manner the rearward end of the pick-up reel is vertically supported from said harvesting machine for lateral reciprocation relative thereto.

The frame 16 is provided with a bearing 31 which supports therein a drive shaft 32 which extends outwardly beyond the frame to receive thereon a sprocket wheel 33 which is engaged and driven by a sprocket chain 34 which is powered by a second sprocket wheel 35 mounted on and driven from the harvesting machine. That portion of the drive shaft 32 which extends inwardly of the frame 16 is aligned with the drive shaft 18 of the pick-up reel assembly and the innermost end of the drive shaft 32 is provided axially with a socket recess 36 which is of a square or like cross sectional configuration and which receives therein an extended spline portion 37 on the end of the drive shaft 18 which spline mates in said recess and is reciprocal relative thereto. A pair of collars 38, mounted on drive shaft 32, and 39 mounted on shaft 18, securely retain a flexible covering 40 in surrounding condition around the splined construction of the shafts 32 and 18 to house the same.

Figures 2, 3:
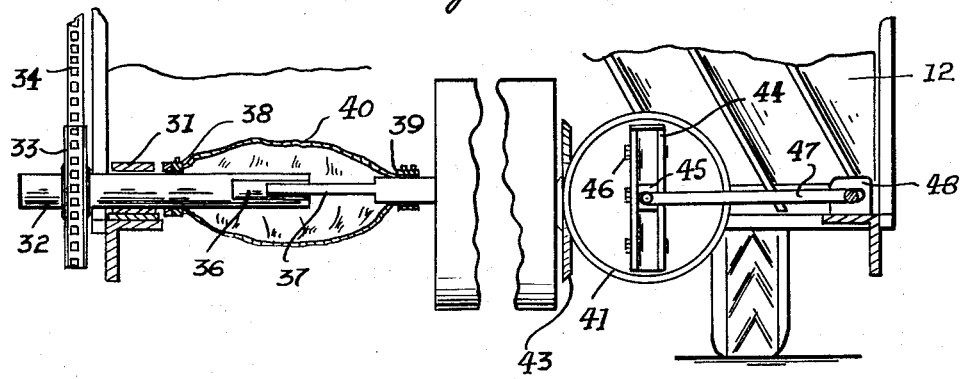
Fig. 2 is an enlarged vertical section taken on line 2—2, Fig. 1.
Fig. 3 is an enlarged vertical section taken on line 3—3, Fig. 1.
Figure 4:
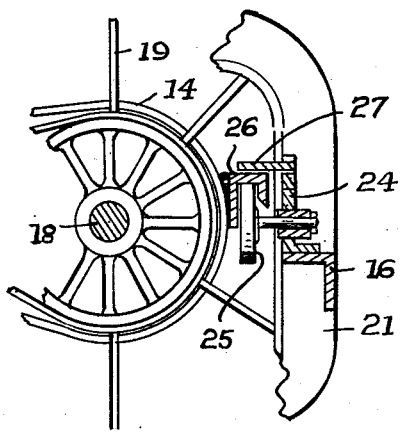
Fig. 4 is an enlarged vertical section taken on line 4—4, Fig. 1.

At the opposite end of the pick-up reel and within the framework of frame 15 a gear 41 is rotatably mounted in a bearing housing 42 secured to the end of the pick-up reel, and the gear 41 peripherally engages with a second gear 43 carried on the adjacent end of the drive shaft 18. The gear 41 is provided on the forward face thereof, Fig. 2, with a slide box 44 which extends diametrically of the face of the gear and reciprocally contains therein a slide piston 45 which is adjustably secured in selected positions lengthwise of the slide box 44 by means of a plurality of longitudinally spaced set screws 46 in the side of the slide box 44. Pivotally secured to the forward face of the slide piston 45 is one end of a Pitman arm 47, the second end of which is pivotally secured between a pair of spaced plates 48 rigidly supported on the frame 15.

By the foregoing construction, adjustment of the slide piston 45 longitudinally of the slide box 44 will selectively control the eccentricity of the Pitman connection to the gear 41. Thus, as the shaft 18 of the pick-up reel assembly is rotated to produce rotation of the pick-up tines 19, the gear 43 will cause rotation of its meshed gear 41 thereby creating eccentric rotation of the gear 41 by reason of the fixed positioning of the extended end of the Pitman arm 47 on the frame 15. This eccentric operation of gear 41 will effect a lateral reciprocation of the entire pick-up reel assembly by reason of the rigid attachment of the housing 42 of gear 41 to the end of the pick-up assembly.

Thus, it is apparent from the foregoing that a new and novel pick-up assembly for a harvesting machine has been provided in which the pick-up reel and associated tines are mounted on the forward end of the harvesting machine where they are operatively reciprocated laterally of the machine travel and path of machine travel simultaneously with the forward motion of the machine and the conventional forward, upwardly and rearward rotation of the pick-up tines in the reel assembly. By the construction described a completely new and improved pattern of tine travel is accomplished whereby the tines of the pick-up reel, while continuously moving rotatably in the same direction as that of machine travel, are simultaneously reciprocated laterally of the machine to describe convolute, angular paths of travel relative to the normal direction of machine travel to insure that, regardless of the direction in which the swathed harvest lies in the field, the tines will angularly approach and engage all the swathed harvest in the field to gather the same with greatly improved efficiencies over prior devices.

It is also evident that provision has been made in the aforedescribed construction for the ready and easy control of the reciprocal movement of the pick-up reel so that it may be pre-selectably controlled throughout its entire limit of movement merely by adjustment of the eccentric location of the slide piston in the slide box on the actuating gear.

Figure 6:
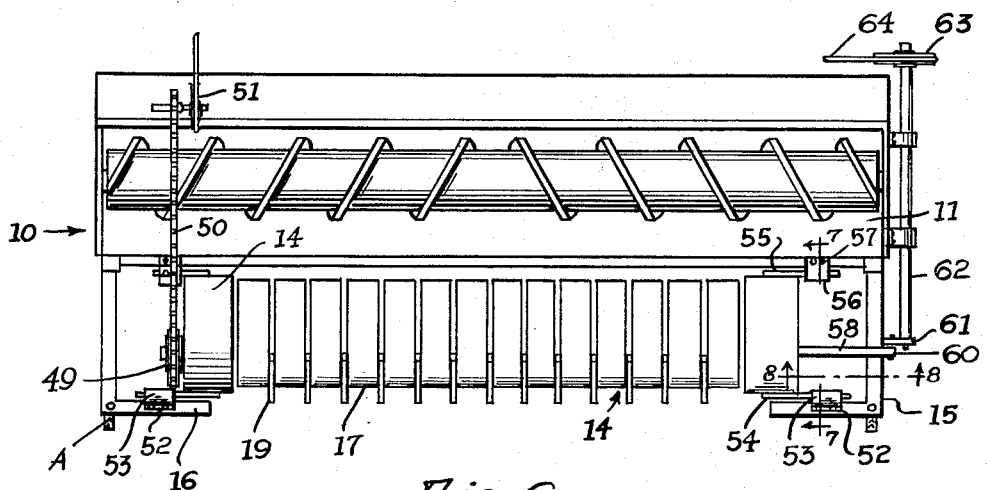
Fig. 6 is a top plan view similar to Fig. 1 of a modified form of the invention.
Figure 7:
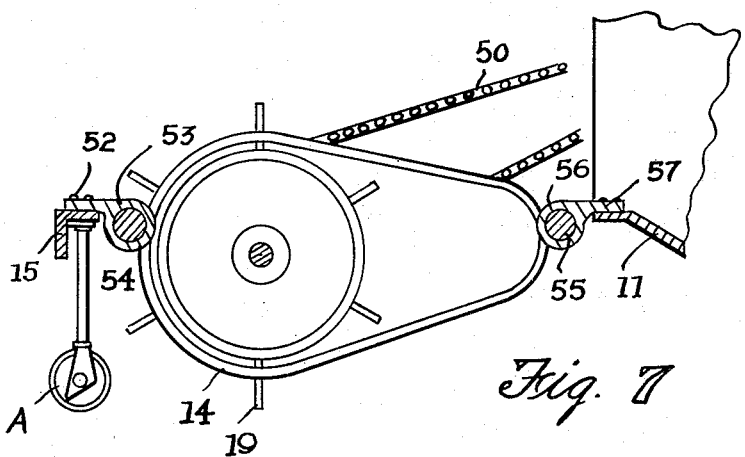
Fig. 7 is en enlarged vertical section taken on line 7—7, Fig. 6.
Figure 8:
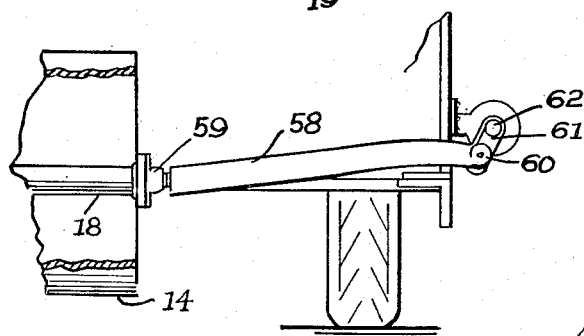
Fig. 8 is an enlarged vertical section taken on line 8—8, Fig. 6.

Turning now to Fig. 6 there is shown another modified embodiment which is illustrative of the basic principle of the present invention. In this construction the conventional reel and tine assembly is located, as before, laterally of the front end of a harvesting machine.

In the present embodiment a sprocket driving wheel 49 is secured directly to the shaft 18 of the reel assembly within the confines of the end frame 16 and is operatively driven by a sprocket chain 50 from a source 51 on the machine.

The inturned end of the frame 16 is provided with a bracket member 52 secured on the frame to extend rearwardly therefrom and which carries on the rearward portion an elongated tube 53 which telescopically engages and supports a circular rod 54 which is horizontally secured on the adjacent endmost stripper plate 14 of the reel assembly. The same construction including the bracket, tube and bar is provided on the inturned end of the frame 15 to reciprocably support that end of the reel assembly.

On the rearward side of the reel assembly a second pair of circular rods 55 are supported at each end of the assembly on the endmost stripper plates, which rods telescopically engage tube members 56 carried by brackets 57 secured to the forward end of the gathering platform 11 of the machine. In this manner the rearward edge of the reel assembly is vertically supported for lateral reciprocation on the front of the harvesting machine.

The operation mechanism for causing reciprocation of the reel assembly includes a crank rod 58 which is secured universally as at 59 to the end of the reel shaft 18 at one end of the crank, with the second end of the crank rod extending beyond the end of the frame 15 where it is pivotally secured as at 60 to one end of a crank 61, the second end of which is fixed to the end of a drive shaft 62 for rotation therewith. The drive shaft 62 extends rearwardly of the machine to carry a drive wheel 63 thereon which has operative connection through a drive belt 64 to a power source on the harvesting machine.

By the foregoing construction rotation of the drive shaft 62 will cause rotation of the crank 61 resulting in the reciprocal movement of the crank rod 58 and the pick-up reel assembly to which the crank rod 58 is secured through the reel shaft 18.

From the foregoing it will be seen that a construction has been provided which will satisfy and accomplish all the objects and advantages heretofore set forth, and while the invention has herein been disclosed by reference to certain terms of preferred embodiments, it is to be understood that such embodiments as are shown in the drawings and described herein are intended for the purposes of illustration only, not as limitations, and it is contemplated that various modifications in the constructions and combinations shown will occur to those skilled in the art and will not constitute departures of the spirit and scope of the present invention as are specifically enumerated in the hereinafter appended claims.

I claim:

1. In combination with a harvester a pick-up device including a reel formed by a shaft having plural spaced tines extending therefrom, cooperating engaging members secured to said reel and harvester forming support means for said reel, the engaging members of the reel being reciprocable transverse the harvester upon the engaging means which are secured to the harvester, a shaft driven from said harvester having telescopic splined engagement with said reel shaft, power means operably connected to said drive shaft, and drive means operably interconnecting said drive shaft and said reel for reciprocating said reel laterally of said harvester.

2. A construction as defined in claim 1 wherein said last-named means includes a gear on said reel shaft, a second gear meshed with said first gear, and a pitman arm having one end eccentrically connected to said second gear and an opposite end pivotally connected to a rigid element of said harvester.

3. In combination with a harvester a pick-up device including a reel formed by a shaft having plural spaced tines extending therefrom, cooperating engaging members secured to said reel and harvester forming support means for said reel, the engaging members of the reel being reciprocable transverse the harvester upon the engaging means which are secured to the harvester, drive means for rotating said shaft, a powered crank rod, and crank means interconnecting said crank rod and said reel to reciprocate said reel relative to said harvester.

4. In combination with an agricultural implement a pick-up device including a reel, frame means mounting said reel for axial rotation, means supporting the reel on the implement for longitudinal reciprocal movement transverse the implement, drive means from said implement connected with said reel and imparting rotary movement thereto, and means interconnecting said reel and said frame operable by rotation of said reel to oscillate said reel axially thereof.

5. In combination with an agricultural implement a pick-up device comprising a reel with tines, said reel extending transverse the implement, means supporting the reel on the implement for axial rotation, means supporting the reel on the implement for longitudinal reciprocal movement transverse the implement, and power means operatively connected to the reel constantly axially rotating and constantly axially reciprocating the reel in respect to the implement.

6. In combination with an agricultural implement a pick-up device comprising a reel with tines, said reel being immovably secured to a shaft for rotation therewith, said shaft being axially rotatably supported on the implement, means supporting the reel and its shaft for longitudinal reciprocal movement transverse the implement, and power means operatively connected to the reel and operating to rotate and reciprocate the reel.

7. A construction as defined in claim 5 wherein, means is associated with the reel for selectively regulating the degree of reciprocation of the reel.

8. A construction as defined in claim 6 wherein, means is associated with the reel for selectively regulating the degree of reciprocation of the reel.

9. In combination with an agricultural implement a pick-up device comprising a reel with tines, said reel being immovably secured to a shaft for rotation therewith, said shaft being axially rotatably supported on the implement, means supporting the reel and its shaft for longitudinal reciprocal movement transverse the implement, and power means operatively connected to the shaft for rotating the same and reciprocating the reel.

10. In combination with an agricultural implement a pick-up device comprising a reel with tines, said reel being immovably secured to a shaft for rotation therewith, said shaft being axially rotatably supported on the implement, means supporting the reel and its shaft for longitudinal reciprocal movement transverse the implement, and power means operatively connected to the shaft for rotating the same, and power means operatively connected with the reel for reciprocating the reel.

11. In combination with an agricultural implement, a pick-up device comprising a reel composed of a plurality of spaced apart tines and stripper plates disposed between the tines, means connected to the reel having reciprocal supporting engagement with the implement to permit movement of the reel transverse the implement, a shaft within and extending longitudinally of the reel, the tines being rigidly secured to the shaft, the shaft being reciprocal with the reel, means supporting the shaft for axial rotation, and power means operatively connected to the reel and shaft for respectively reciprocating and rotating said elements.

12. A construction as defined in claim 11 wherein, the power means simultaneously rotates the shaft and reciprocates the reel.

13. A construction as defined in claim 6 wherein, the means supporting the reel and its shaft for longitudinal reciprocal movement is in the form of cooperating fixed tracks, and wheels engaging the same to provide a sliding movement.

14. A construction as defined in claim 6 wherein, the means supporting the reel and its shaft for longitudinal reciprocal movement is in the form of cooperating fixed tracks, and wheels engaging the same to provide a sliding movement, and means associated with the tracks to prevent disengagement between the wheels and the tracks by reason of vertical movement of the reel.

15. A construction as defined in claim 6 wherein the means supporting the reel and its shaft for longitudinal reciprocal movement is in the form of cooperating fixed tracks positioned at both the front and the rear sides of the reel, and wheels engaging the same to provide a sliding movement.

References Cited in the file of this patent

UNITED STATES PATENTS

| | | |
|---|---|---|
| 1,452,730 | Dremel | Apr. 24, 1923 |
| 2,030,031 | Innes | Feb. 4, 1936 |
| 2,691,266 | Meyer et al. | Oct. 12, 1954 |